(12) United States Patent
Bar (10) Patent No.: US 8,898,966 B2
(45) Date of Patent: Dec. 2, 2014

(54) BLAST AND IMPACT RESISTANT WINDOW PANE SYSTEMS

(75) Inventor: Zvika Bar, D.N. Harei Yehuda (IL)

(73) Assignee: Oran Safety Glass Ltd., Harei Yehuda (IL)

( * ) Notice: Subject to any disclaimer, the term of this patent is extended or adjusted under 35 U.S.C. 154(b) by 221 days.

(21) Appl. No.: 12/312,825

(22) PCT Filed: Nov. 29, 2007

(86) PCT No.: PCT/IL2007/001482
§ 371 (c)(1),
(2), (4) Date: Jun. 22, 2009

(87) PCT Pub. No.: WO2008/068744
PCT Pub. Date: Jun. 12, 2008

(65) Prior Publication Data
US 2010/0024692 A1    Feb. 4, 2010

Related U.S. Application Data

(60) Provisional application No. 60/872,768, filed on Dec. 5, 2006.

(51) Int. Cl.
*F41H 5/04* (2006.01)
*B32B 17/10* (2006.01)
*E06B 5/12* (2006.01)

(52) U.S. Cl.
CPC ........... *F41H 5/0407* (2013.01); *B32B 2369/00* (2013.01); *B32B 2333/04* (2013.01); *B32B 17/10045* (2013.01); *B32B 2367/00* (2013.01); *B32B 17/10055* (2013.01); *E06B 5/12* (2013.01)

USPC .................. 52/171.3; 52/204.593; 52/204.6; 52/786.11; 428/34

(58) Field of Classification Search
USPC ......... 52/171.3, 202, 204.593, 204.6, 204.61, 52/786.1, 786.11; 428/34, 38
See application file for complete search history.

(56) References Cited

U.S. PATENT DOCUMENTS

| 3,624,238 | A |   | 11/1971 | McKenzie |  |
|---|---|---|---|---|---|
| 3,657,057 | A | * | 4/1972 | Shorr et al. | 428/412 |
| 3,671,370 | A | * | 6/1972 | Littell, Jr. | 428/38 |
| 3,930,452 | A | * | 1/1976 | Van Laethem et al. | 109/80 |
| 4,121,014 | A | * | 10/1978 | Shaffer | 428/412 |
| 4,130,684 | A | * | 12/1978 | Littell et al. | 428/212 |
| 4,243,719 | A | * | 1/1981 | Holmes | 340/550 |
| 4,312,903 | A | * | 1/1982 | Molari, Jr. | 428/34 |

(Continued)

FOREIGN PATENT DOCUMENTS

FR    2516646 A1    5/1983

*Primary Examiner* — Adriana Figueroa
(74) *Attorney, Agent, or Firm* — Arent Fox LLP (57) ABSTRACT

Window pane systems which offer improved protection against blast and impact hazards, including contact blast caused by a bomb or a shell, with or without hollow charge and bullets. A window pane system of the present invention includes multiple glass layers, to absorb the ballistic impact of the explosion; a thick polymer such as polycarbonate, to absorb the kinetic energy of the blast including contact blast; and multiple elastic thin layers of polymer such as polycarbonate, to absorb the blast impact such as the shock wave and shrapnel. Optionally, the last layer is extended such that the last layer is covering up to the full width of the window pane system, preferably in all four sides of the window pane system.

14 Claims, 9 Drawing Sheets

(56) References Cited

U.S. PATENT DOCUMENTS

| | | | |
|---|---|---|---|
| 4,321,777 A * | 3/1982 | Sauret et al. | 52/308 |
| 4,619,973 A * | 10/1986 | Smith, Jr. | 525/329.9 |
| 4,747,896 A * | 5/1988 | Anastasie | 156/85 |
| 5,154,953 A * | 10/1992 | de Moncuit et al. | 428/34 |
| 5,496,643 A * | 3/1996 | Von Alpen | 428/432 |
| 5,553,440 A | 9/1996 | Bulger et al. | |
| 5,567,529 A * | 10/1996 | Smith | 428/425.6 |
| 5,778,629 A | 7/1998 | Howes | |
| 5,834,124 A * | 11/1998 | Pease et al. | 428/430 |
| 6,108,999 A | 8/2000 | Smith et al. | |
| 6,333,085 B1 | 12/2001 | Emek | |
| 7,383,666 B2 * | 6/2008 | Coddens | 52/204.62 |
| 2002/0160198 A1 * | 10/2002 | Oshima et al. | 428/412 |
| 2004/0111986 A1 * | 6/2004 | Zurhaar | 52/202 |
| 2006/0032160 A1 * | 2/2006 | Gazaway et al. | 52/202 |

* cited by examiner

BLAST AND IMPACT RESISTANT WINDOW PANE SYSTEMS

FIELD OF THE INVENTION

The present invention is generally in the field of resistant window pane systems, and more particularly the present invention is related to window pane systems which offer improved protection against blast and impact hazards, including contact blast caused by a bomb or a shell, with or without hollow charge and bullets.

BACKGROUND OF THE INVENTION AND PRIOR ART

When an explosive device detonates, high pressure and high temperature are created. In the chemical reaction, compounds break down to form various gases. The concentrated gases are under very high pressure and thus, they expand rapidly. The heat speeds up the individual gas particles, boosting the pressure even higher. In a high explosive, the gas pressure is strong enough to destroy structures and injure and kill people. If the t expands at a rate faster than the speed of sound, the fast expanding gas generates a powerful shock wave that causes the crashing of encountered objects. The pressure can also push pieces of solid material outward at great speed, causing them to hit people or structures with immense force.

The unique burning of explosives creates a sonic wave which velocity depends on the material in which the sonic wave is moving: the material density, elasticity and temperature. The magnitude of the sonic wave is not constant but decays at rate relative to $L^3$, where L is the distance from the place of detonation, given by the equation:

$$E_b = \frac{K_b * 1}{L^3}$$

where E is the energy of the detonation after the explosion, b denotes the type of explosive, K is the explosion constant (for TNT, for example, K=1). The blast impact also depends on the shape of the explosive device. For example: a square explosive device creates a different wave than a conic explosive device or a bullet-like explosive device.

A variety of windows offer blast resistance and impact resistance solutions, most of which typically offer a single type of protection, namely bullet proof, blast resistant or impact resistant. But prior art blast resistant windows cannot withstand the detonation of an explosive device while in contact with the exterior pane of the window. Prior art blast resistant windows may withstand an explosion event that take place several meters away from the window and even tens and hundreds of meters from the window.

U.S. Pat. No. 3,624,238 is concerned with a bullet resistant structure of laminated character comprising outer faces or piles of safety glass with an intermediary ply formed by a polycarbonate and a resin.

U.S. Pat. No. 4,312,903 deals with an impact resistant double glazed structure and is concerned in particular with the thickness of the layers of the laminated window panes, and their chemical compositions. U.S. Pat. No. 6,333,085 discloses fixed double glazing window systems which offer improved protection against both blast and impact hazards, but will not withstand a contact blast.

Figure 1:
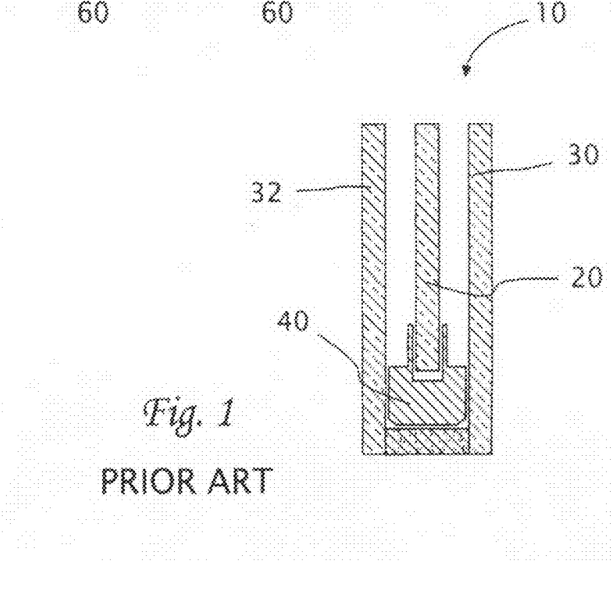

Triple glazed windows are also known as described, for example in U.S. Pat. No. 5,553,440. Such windows may also be broken easily. U.S. Pat. No. 6,108,999 offers some improvement providing a window glazing unit which may be bullet-resistant, and which offers the advantages of being shatter-resistant but not blast resistant. U.S. Pat. No. '999 provides a window 10 illustrated in FIG. 1. Window 10 includes two glass sheets 30 and 32, and a shatter-resistant thermoplastic sheet 20 in between glass sheets 30 and 32. A U shaped part 40 supports thermoplastic sheet 20, thus thermoplastic sheet 20 is smaller in size than glass sheets 30 and 32. Being smaller in size further reduces the elasticity effect of thermoplastic sheet 20, which elasticity is not sufficient to absorb the blast impact of a bomb which detonates a few meters away.

There is therefore a need for a window pane system which can offer improved protection against blast and impact hazards, including contact blasts caused by a bomb or a shell, with or without hollow charge and bullets.

Figure 2:
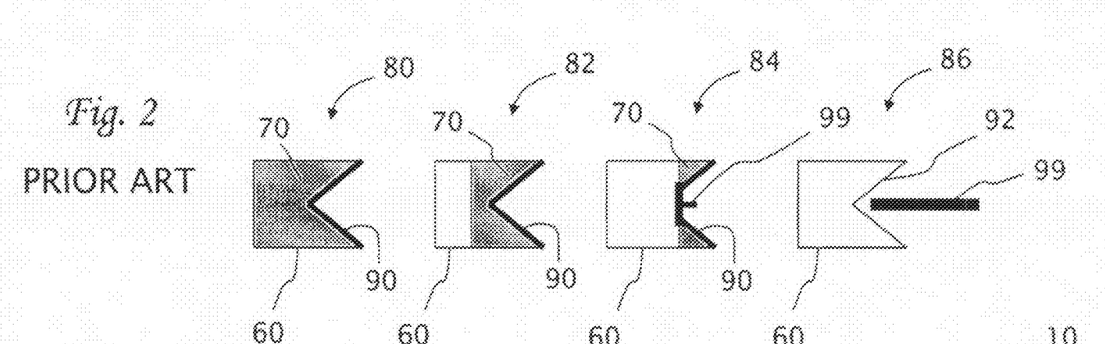
FIG. 2 illustrates the operational steps of a prior art hollow charge device.

FIG. 2 illustrates the operational steps of a hollow charge device 60. In step 80 device 60 is in a state before detonation; in step 82 device 60 is in a state just after detonation; in step 84 device 60 is in a state well after detonation, where a liner 99 has started to form; in step 86 device 60 is in a state just after detonation. In step 86, the metal glazing 70 of the inner cone has completely converted into a liner 99 which moves forward at an accelerated speed. The shape of cone 92, that is the radius and head angle, determine the angle at which the shock wave will move forward.

Figure 3:
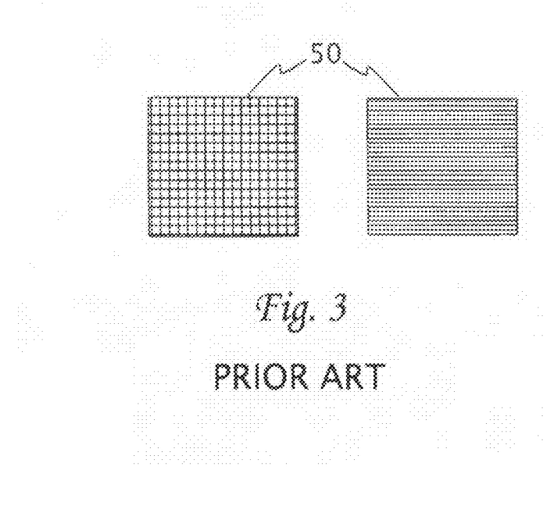
FIG. 3 illustrates, by way of example, prior art slat armors to a hollow charge device.

To eliminate the effect of liner 99, the symmetry of device 60 and more particularly, the symmetry of inner cone 92 must be breached, which is done by slat armor 50 such as metal bars nets and the like (see FIG. 3). Slat armors are statistical barriers that are disposed in front of a window to be protected. When device 60 hits the net of slat armor 50 and the dent formed in device 60 cancels the symmetry of device 60 and thereby the effect of liner 99 is eliminated.

DEFINITIONS

The terms "blast window" and "blast resistant" refer to the ability of a window pane system to withstand blast caused, for example, by an explosion of a bomb which is in contact with the exterior pane.

The terms "contact blast" and "contact blast resistant", refer to the ability of a window to withstand the impact force applied for example by a bomb or a shell that exploding when being in contact with the exterior pane of the window.

Figure 4:
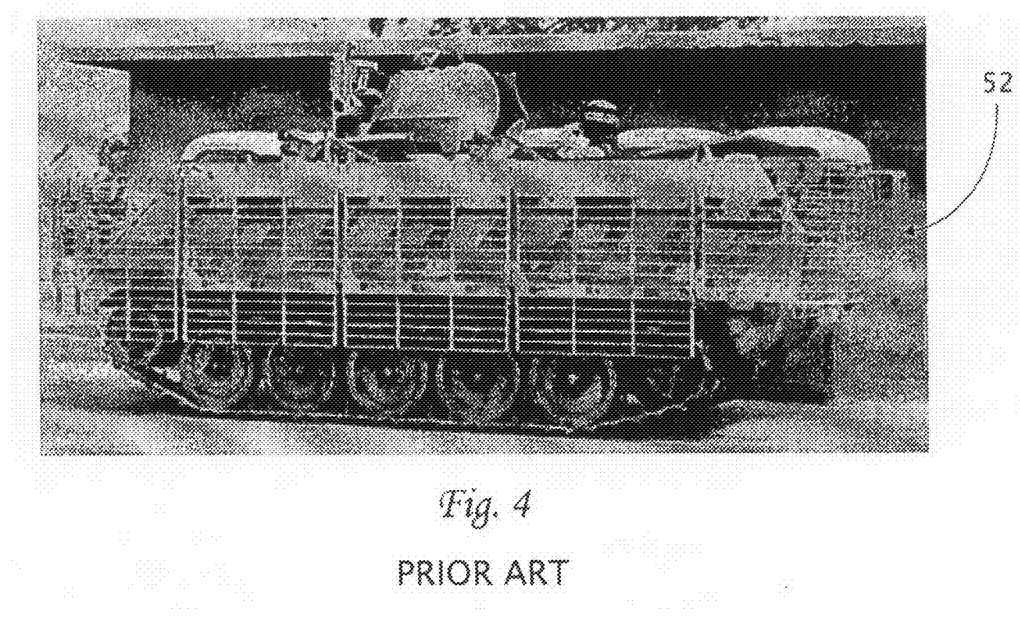
FIG. 4 depicts an army vehicle protected by slat armor.

The term "slat armor" is used herein in the context of metal structures such as metal bars nets and the like (see FIG. 3). Slat armors are statistical armor barriers that are disposed in front of target to be protected. FIG. 4 depicts an army vehicle protected by slat armor 52.

The term "Polycarbonate" is used herein for transparent materials selected from the group consisting of Polyester, Polycarbonate, Acrylic, or any other known in the art.

SUMMARY OF THE INVENTION

It is thus the intention of the present invention to overcome prior art deficiencies and provide a window pane system which can offer improved protection against blast and impact hazards, including contact blasts caused by a bomb or a shell or a bullet, the shell or bullet being with or without hollow charge.

An aspect of the present invention is to provide window pane systems including a layer of thick polymer such as polycarbonate, to absorb the kinetic energy of the blast including contact blast.

According to the teachings of the present invention there is provided a window pane system, which includes: a) multiple glass layers, to absorb the ballistic impact of the explosion; b) a thick polymer such as polycarbonate, to absorb the kinetic energy of the blast including contact blast; and c) multiple elastic thin layers of polymer such as polycarbonate, to absorb the blast impact such as the shock wave and shrapnel. Optionally, the last layer is extended such that the last layer is covering up to the full width of the window pane system, preferably in all sides of the window pane system.

The elastic layers are adhered with glue such as polyurethane, which extends the elasticity of the polymer layers.

Optionally, window pane system further includes a gap disposed between the thick layer and the thin layers. The width of the gap is preferably of a size wide enough for the thick layer to move inside the gap and thereby absorb part of the blast impact. The gap is typically filled with gas such as air, which is treated to prevent condensation as in prior art. The positioning of the gap is not limited to be between the thick layer and the thin layers, and in other embodiments of this invention a gap can be disposed between any two adjacent layers.

Optionally, window pane system further includes slat armor in front of the slat armor, to neutralize the hollow charge effect of arriving shells or bullets.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 1 shows an example of a prior art window with glass sheets, and a shatter-resistant thermoplastic sheet in between.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

By way of introduction, the principal intentions of the present invention include providing a window pane system which can offer improved protection against blast and impact hazards, including contact blasts caused by a bomb or a shell or a bullet, the shell or bullet being with or without hollow charge.

Figure 5:
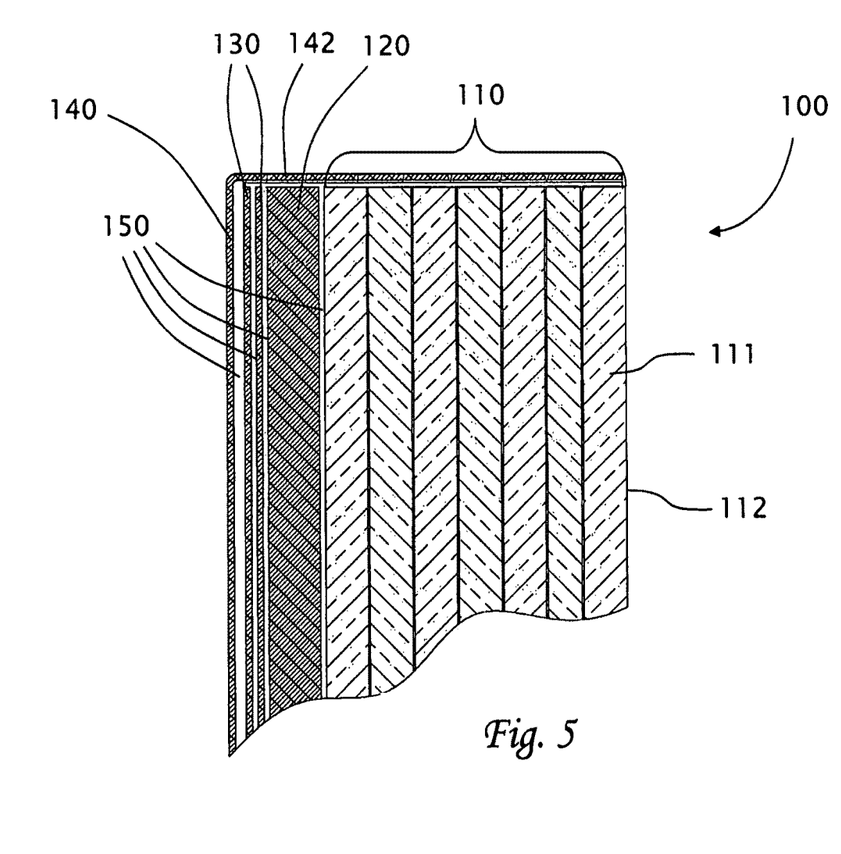
FIG. 5 illustrates a cross-section of a blast resist window pane system according to embodiments of the present invention.

FIG. 5 illustrates a cross-section of a blast resist window pane system 100 according to embodiments of the present invention. Window pane system 100 includes layers of glass 110, as in prior art. Layers of glass 110 can be made of a transparent material, the transparent material selected from the group consisting of glass, ceramics, tempered silica glass, or any other known in the art. The transparent material is referred to herein after as "glass". The external surface 112 of the first glass layer 111 is the surface with which the explosive device makes the first contact and detonates. The objective of the layers of glass 110 is, as in prior art blast resist window pane systems, to absorb the ballistic impact of the explosive device and is designed according to the ballistic threat glass 110 is aimed to defend.

The next layer after the layers of glass 110 is a layer 120 of thick elastic and transparent material. The thick transparent material is selected from the group including Polyester, Polycarbonate, Acrylic, or any other transparent material polymers known in the art. The objective of the thick layer of Polycarbonate 120 is to absorb the kinetic energy of the blast impact and is designed according to the magnitude of threat glass 110 is aimed to defend. Thick layer 120 also blocks relatively large shrapnel.

The next layers after the thick layer of Polycarbonate 120 are layers 130 of thin transparent material. The transparent material is selected from the group of materials including Polyester, Polycarbonate, Acrylic, or any other polymers known in the art. The objective of the thin layers of Polycarbonate 130 is to provide blast resist window pane system 100 with elongation, and absorb the blast shock wave is designed according to the magnitude of threat glass 110 is aimed to defend. Thin layers 130 are strong and elastic.

Figure 6A:
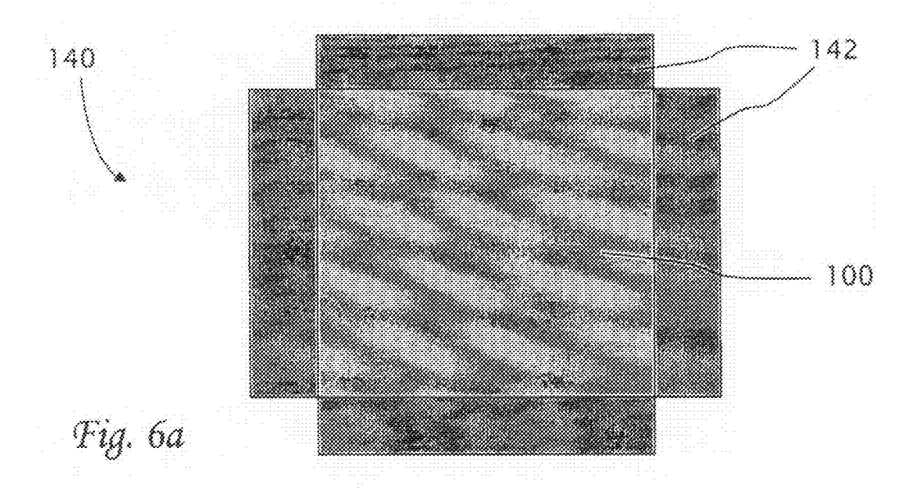
FIG. 6a illustrates a front view of the last thin layer of Polycarbonate of a blast resist window pane system according to embodiments of the present invention.
Figure 6B:
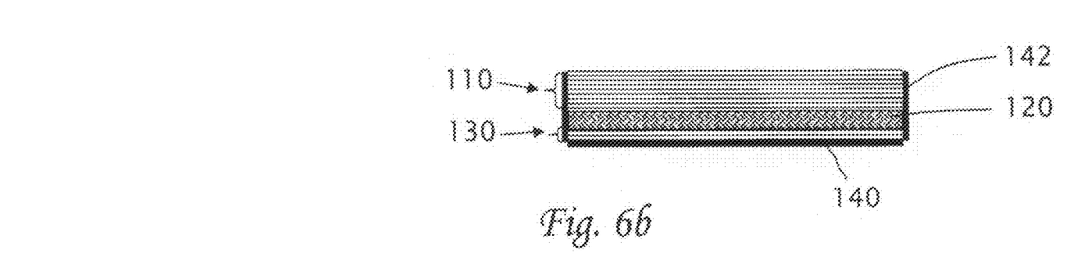
FIG. 6b illustrates a cross-section of the last thin layer of Polycarbonate of a blast resist window pane system according to embodiments of the present invention.

To enhance the elasticity of thin layers 130 the last thin layer 140 is designed such that thin layer 140 has an increased blast absorption capacity. The last thin layer 140 is the most internal layer of blast resist window pane system 100. FIG. 6*a* illustrates a front view and FIG. 6*b* illustrates a cross-section of the last thin layer 140 of Polycarbonate of a blast resist window pane system 100 according to embodiments of the present invention.

Figure 6C:
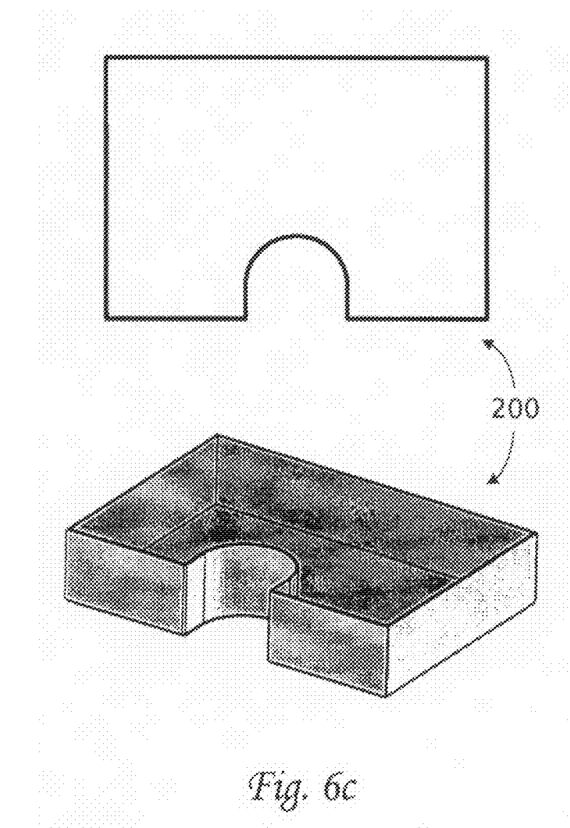
FIG. 6c illustrates a front and perspective views of a blast resist window pane system according to embodiments of the present invention, the window having a non-rectangular shape.
Figure 6D:
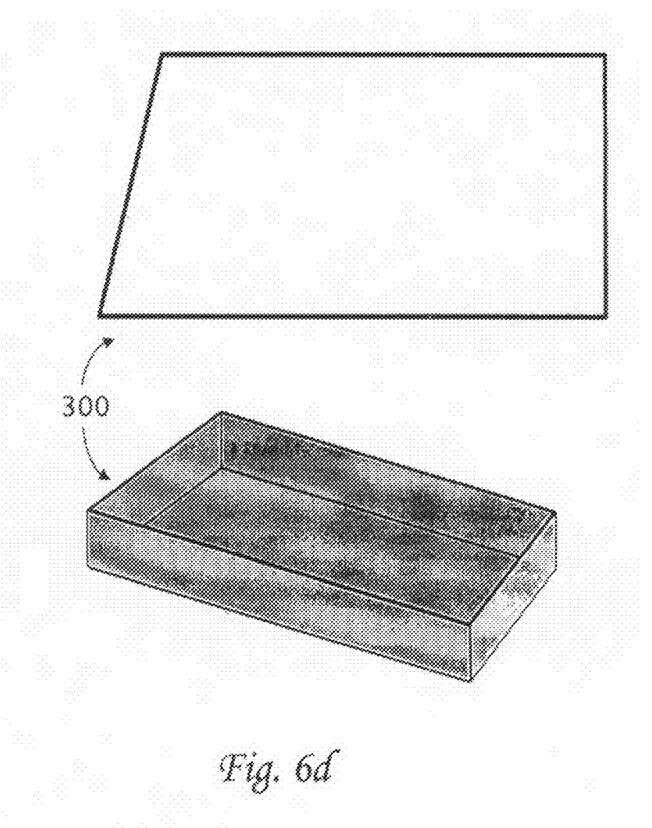
FIG. 6d illustrates a front and perspective views of a blast resist window pane system according to another embodiment of the present invention, the window having a non-rectangular shape.

Thin layer 140 is has, in the example shown in FIG. 6*a*, preferably four folding parts 142 that are folded to wrap all four sides of blast resist window pane system 100. Note that the window may have any geometrical shape and the folding parts 142 are adapted to the window shape. FIG. 6*c* illustrates a front and perspective views of a blast resist window pane system 200, the window having a trapezoid shape. FIG. 6*d* illustrates a front and perspective views of a blast resist window pane system 300, the window having a non-rectangular shape.

Referring back to FIGS. 5, 6*a* and 6*b*, when a contact blast occur at external surface 112, folding parts 142 pull away from parts 142 initial position to extend thin layer 140 elasticity and thereby prevent tearing of thin layer 140 due to the high-speed dynamic Load of the blast. The objective of thin layers 140 is then to absorb the remainder of the blast shock wave and to be spall resist, that is prevent shrapnel from and entering the space beyond blast resist window pane system 100.

Figure 9A:
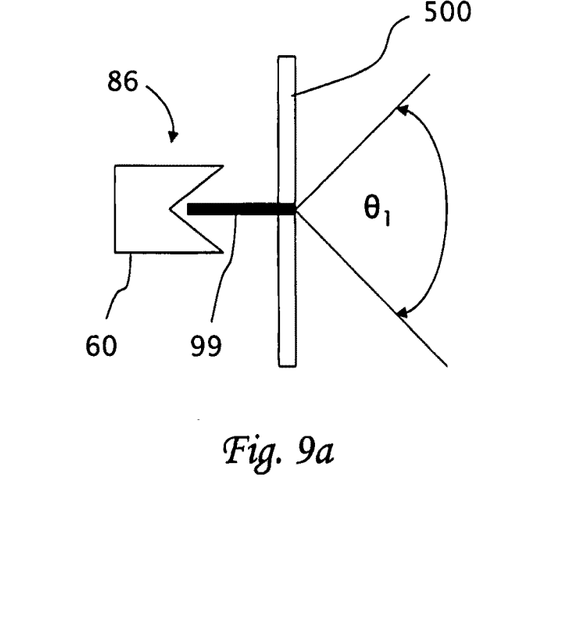
FIG. 9a illustrates a hollow charge device detonating on a steal barrier, having a liner penetration the steal barrier and dispersing at an angle $\theta_1$.
Figure 9B:
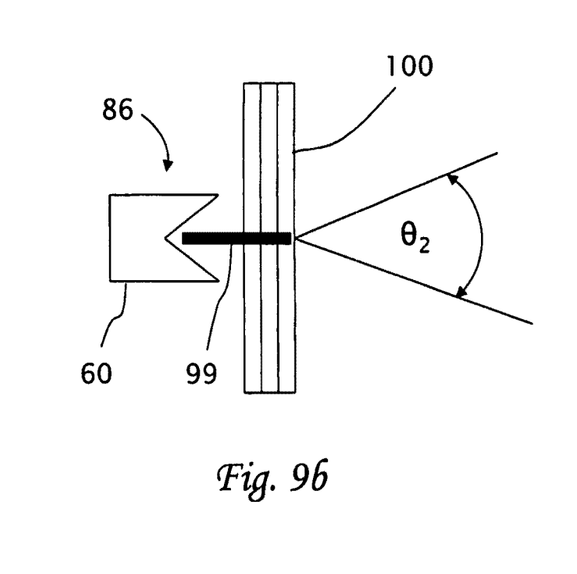
FIG. 9b illustrates a hollow charge device detonating on a blast resist window pane system according to embodiments of the present invention, having a liner penetration the widow system and dispersing at an angle $\theta_2$.

Blast resist window pane system 100 has another important advantage: to substantially reduces the effective angle of destructive movement of a liner 99 (see FIG. 2) created by the detonation of a hollow charge 60. FIG. 9*a* illustrates a hollow charge device 60 detonating (step 86) on a steal barrier 500, having a liner 99 penetration the steal barrier 500 and dispersing at an angle $\theta_1$. Typically, $\theta_1$ is about 90° for a typical steal barrier 500. FIG. 9*b* illustrates a hollow charge device 60 detonating (step 86) on a blast resist window pane system 100 according to embodiments of the present invention, having a liner 99 penetration the widow system 100 and dispersing at an angle $\theta_2$. Typically, $\theta_2$ is less that 65° for a blast resist window pane system 100 according to embodiments of the present invention.

All layers are adhered to each other by designated glues 150, the glues 150 selected from the group including P.V.B (Polyvinyl Butyrel), Polyurethane, Acrylic, SentryGlas, Noviflex, E.V.A (Etjylehe Vinyl Acetate), Epoxy and the like. Glue 150 is preferably selected to also increase the overall elasticity of blast resist window pane system 100. Blast resist window pane system 100 may include any number of glass layers and Polycarbonate layers.

Figure 7A:
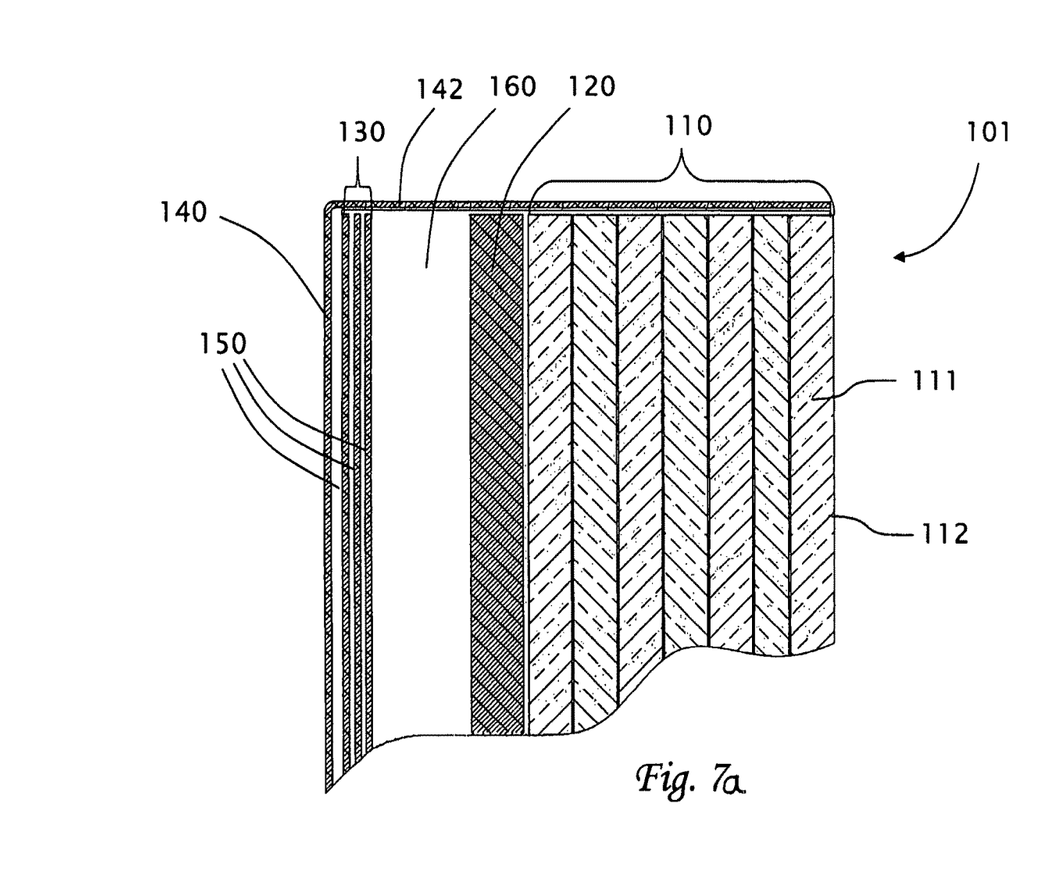
FIG. 7a illustrates embodiments of a blast resist window pane system according to the present invention, including a gap of gas between the thick of Polycarbonate and the last thin layer of Polycarbonate.
Figure 7B:
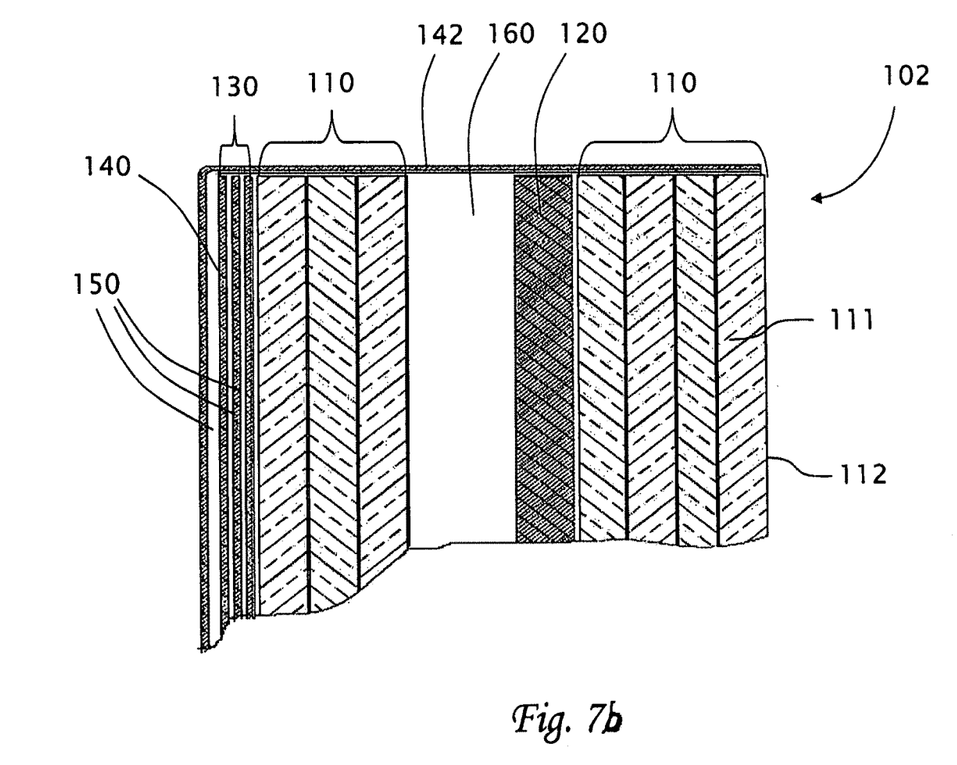
FIG. 7b illustrates another embodiment of a blast resist window pane system according to the present invention, including a gap of gas and a thick of Polycarbonate and the last thin layer of Polycarbonate between the glass layers.

In another embodiment of a blast resist window pane system 101, according to the present invention, a gap 160 is set between thick layer 120 and thin layers 130, as illustrated in FIG. 7*a*. The width of gap 160 is preferably of a size wide enough for thick layer 120 to move inside space 160 and thereby absorb part of the blast impact. Gap 160 is typically filled with gas such as air, which is treated to prevent condensation as in prior art. Gap 160 positioning is not limited to the position between thick layer 120 and thin layers 130, and in other embodiments of this invention gap 160 can be disposed between any adjacent layers. For example, FIG. 7*b* illustrates another embodiment of a blast resist window pane system 102, including a gap 160 of gas and a thick layer of Polycarbonate 120, disposed among the glass layers 110.

Figure 8:
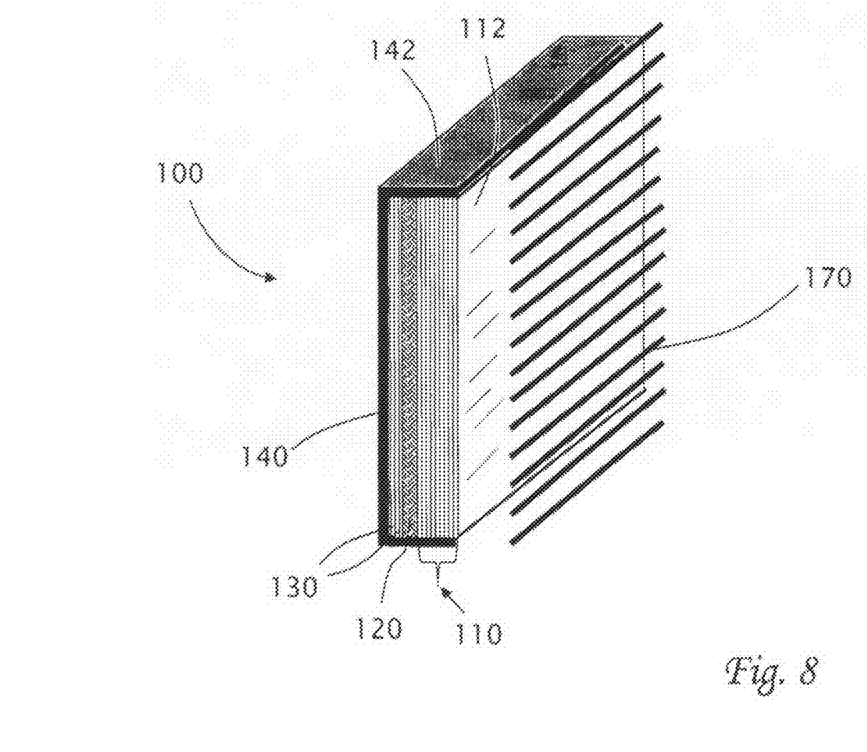
FIG. 8 illustrates a blast resist window pane system according to embodiments of the present invention including slat armor.

In another embodiment of the present invention slat armor 170 is disposed in front of blast resist window pane system 100. Statistically, there are about 80% (and even more) chance that slat armor 170 will dent a hollow charge device 60 before impact, and thus prevent a liner 99 from being created. FIG. 8 illustrates a blast resist window pane system 100 according to embodiments of the present invention including slat armor 170. The objective of the section consisting of the multiple glass layers 110 and thick Polycarbonate layer 120 is to absorb the blast energies and the objective of multiple Polycarbonate layers 130 and 140 is to absorb the spall.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A window pane system, comprising:
   multiple layers of glass sheet;
   a thick layer of elastic and transparent material adhered to at least one of the multiple layers of glass sheet;
   two or more thin layers of elastic and transparent material; and
   a gap disposed between the thick layer and the two or more thin layers so that the thick layer is configured to move inside the gap to absorb part of an impact of a blast;
   wherein the last thin layer of the two or more thin layers is adhered to another of the thin layers via an adhesive layer and the last thin layer comprises at least one folding part configured to wrap one or more sides of the window pane system, whereby said last thin layer provides an increased absorption capacity for the blast.

2. The window pane system of claim 1, wherein the window pane system has sufficient capacity to absorb the impact of the blast, and
   wherein the window pane system has sufficient capacity to substantially reduce an effective angle of a destructive movement of a liner created by detonation of a hollow charge.

3. The window pane system of claim 1, wherein said elastic and transparent material of said thick layer is selected from the group of polymers including Polyester, Polycarbonate and Acrylic.

4. The window pane system of claim 1, wherein said elastic and transparent material of each of said two or more thin layers is selected from the group of polymers including Polyester, Polycarbonate and Acrylic.

5. The window pane system of claim 1, wherein said glass layers have sufficient capacity to absorb the ballistic impact of said blast.

6. The window pane system of claim 1, wherein said thick layer has sufficient capacity to absorb the kinetic energy of said blast including contact blast.

7. The window pane system of claim 1, wherein said thin layers have sufficient capacity to absorb said blast shock wave and shrapnel.

8. The window pane system of claim 1, wherein all of said layers are adhered to each other by glues.

9. The window pane system of claim 8, wherein said glues are selected from the group of materials including Polyvinyl Butyrel, Polyurethane, Acrylic, SentryGlas, Noviflex, Ethylene Vinyl Acetate and Epoxy.

10. The window pane system of claim 8, wherein said glues increase the overall elasticity of the window pane system.

11. The window pane system of claim 1, wherein said gap is filled with gas which is treated to prevent condensation.

12. The window pane system of claim 11, wherein said gas is air.

13. The window pane system of claim 1, further including a slat armor device, wherein said slat armor device is disposed in front of the window pane system with respect to a flying path of a hollow charge device.

14. The window pane system of claim 1, wherein the multiple layers of glass sheet are directly bonded to each other.

* * * * *